INVENTOR.
KARL P. SCHUBERT
BY Woodling, Krost, Granger and Rust
ATTORNEYS

United States Patent Office 3,364,788
Patented Jan. 23, 1968

3,364,788
MACHINE DRIVE TRAIN
Karl P. Schubert, Cleveland Heights, Ohio, assignor to
The National Acme Company, a corporation of Ohio
Filed June 4, 1965, Ser. No. 461,283
10 Claims. (Cl. 74—665)

ABSTRACT OF THE DISCLOSURE

A drive train is shown for a machine tool. The machine tool may have a relatively large diameter spindle carrier with a plurality of spindles occupying a central position in the machine tool. An idler ring gear surrounds the spindle carrier, is driven by a drive pinion and in turn drives a plurality of idler pinions. Each idler pinion is connected to drive a tool slide for cooperation with a respective spindle position of the spindle carrier. The idler ring gear is one having no radial bearing and may be inserted radially into a pocket in the frame of the machine tool. The sole radial restraint for the idler gear is the engagement of the teeth thereof with the pinions.

---

The invention relates in general to drive trains for machines, and more particularly to a drive train of gears which includes an idler gear supported on the pitch diameter of other gears so that the idler gear is without a radial bearing.

In many machines, such as multiple spindle machine tools, there is a large central rotary assembly, such as a spindle carrier. Surrounding this central rotary member may be other movable members which must be driven by a drive train. In the past it has been customary to provide a ring gear surrounding this rotary member or spindle carrier and to have this ring gear journalled on radial bearings in the machine frame. However, where the speed of the ring gear is high, the journal bearing surface speeds are high causing undue friction. Also, it is difficult to maintain concentricity between the ring gear and the machine frame on such large diameters. Still further, with a ring gear having a radial bearing surface, the ring gear must be assembled into the machine frame in an axial direction and this means that the machine frame must be split into two parts to permit this assembly of the ring gear. To split the machine frame into two parts means that very large pieces of the frame must be machined, as on a boring mill, to fit together concentrically. This still further complicates the problem because one must provide concentric mating surfaces between two parts of the machine frame and also concentric with a journal surface on the machine frame to support and journal the ring gear.

Accordingly, an object of the invention is to obviate the above-mentioned disadvantages.

Another object of the invention is to provide an idler gear without a radial bearing.

Another object of the invention is to provide an idler gear supported only by axial thrust walls and without a radial bearing so that the ring gear may be assembled into the machine in a radial direction.

Another object of the invention is to provide a drive train with an idler gear supported only by other gears with which it is in mesh.

Another object of the invention is to provide an idler gear without a bearing and with pinions in mesh on each of four equal segments of the idler gear periphery to restrain free movement of the idler gear in all radial directions.

Another object of the invention is to provide a machine tool having a rotatable spindle carrier with a ring gear surrounding, but spaced from, the spindle carrier and with the ring gear supported only by other gears intermeshed therewith so that the ring gear may drive movable slides surrounding the spindle carrier.

The invention may be embodied in a machine comprising, in combination, a frame having a central axis, a drive train in said machine, a bearingless idler gear included in said drive train concentric with said central axis and having first and second planar parallel sides, first and second axial thrust means axially spaced apart and disposed on opposite sides of said idler gear, the thickness of said idler gear between said parallel sides being less than the spacing between said first and second thrust means to permit radial insertion of said idler gear between said first and second axial thrust means, a plurality of pinions in said drive train, means journalling said pinions on said frame in the plane of said idler gear and each pinion meshing with said idler gear, the periphery of said idler gear including at least three equal arcuate segments, and said pinions being disposed around the periphery of said idler gear with at least one pinion in each segment to restrain free movement of said idler gear in all radial directions by engagement of the teeth thereof on the pitch circle of said idler gear.

Other objects and a fuller understanding of the invention may be had by referring to the following description and claims, taken in conjunction with the accompanying drawings, in which:

Figure 1:
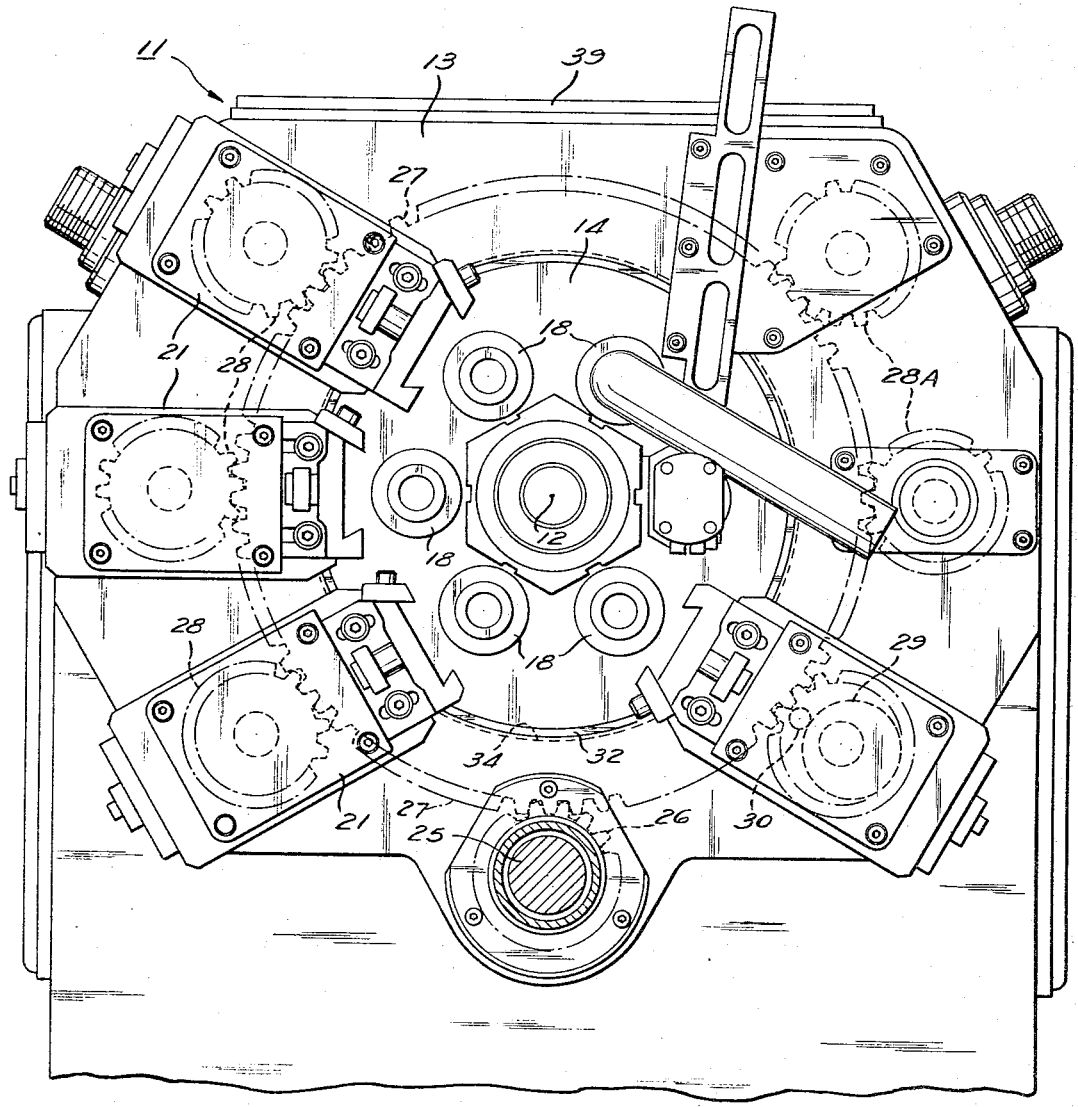
FIGURE 1 is a front elevational view of the head stock of a machine tool embodying the invention and as viewed from the right of FIGURE 2.
Figure 2:
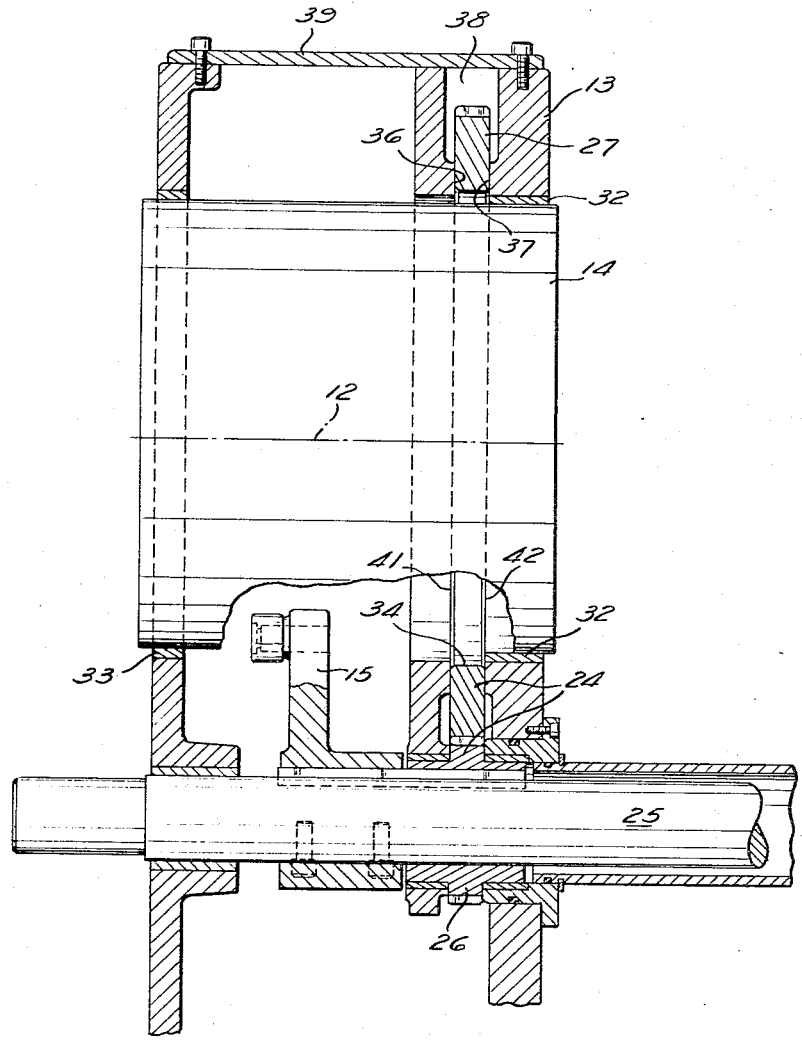
FIGURE 2 is a longitudinal sectional view of the machine frame of FIGURE 1.
Figure 3:
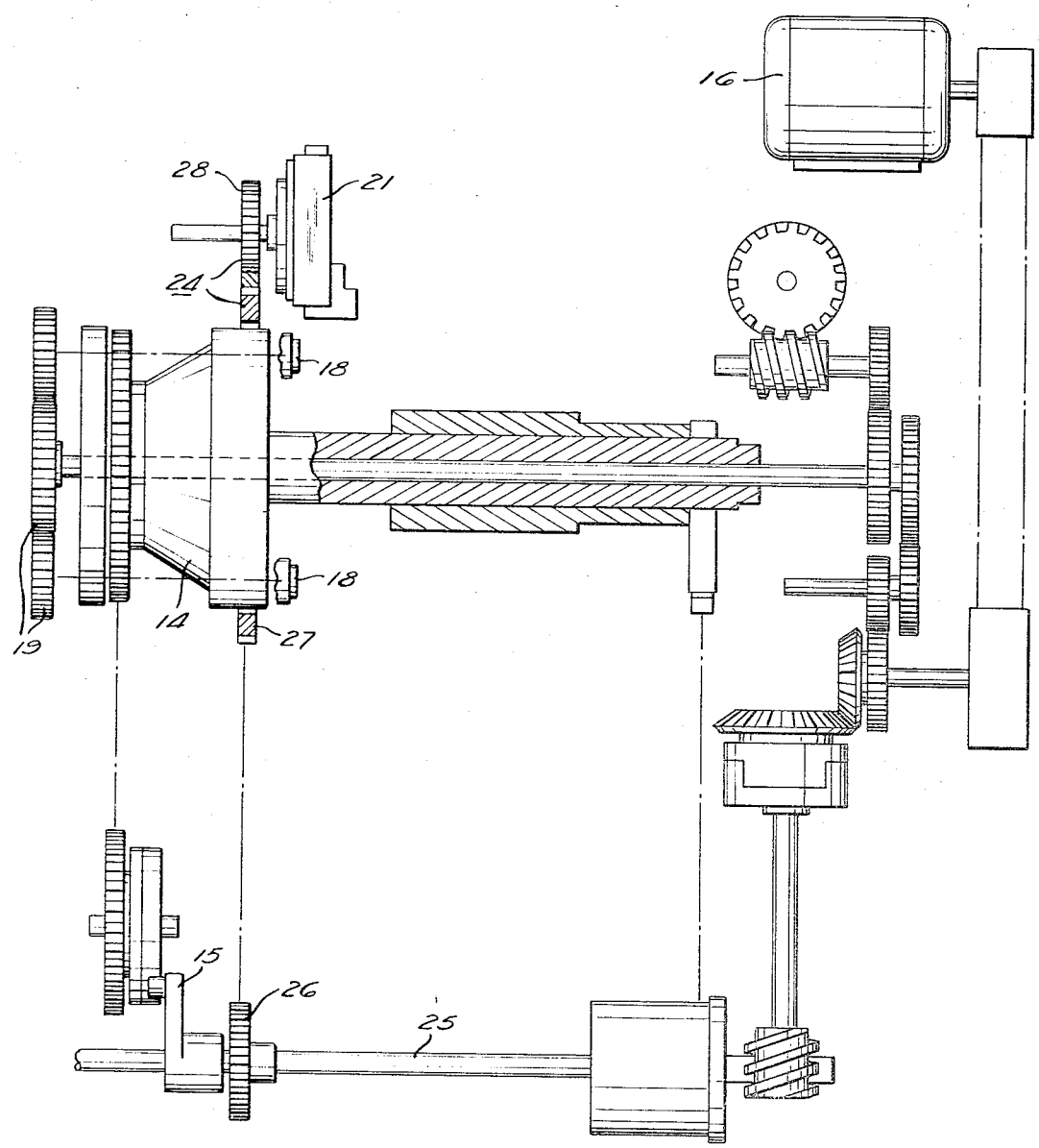
FIGURE 3 is a schematic diagram of the drive train of the machine of FIGURE 1.

The invention may be incorporated in a machine 11 illustrated as a machine tool, in this case a multiple spindle machine tool having a central axis 12. The machine 11 has a frame 13 journalling a spindle carrier 14 about the axis 12. The spindle carrier 14 is a large rotary member which indexes by means of an indexing mechanism 15 driven from a main motor 16. The spindle carrier 14, by way of example, has a plurality of rotatable spindles 18 therein, in this case shown as six in number. Drive gears 19 supply drive power of the spindles from the main motor 16.

A plurality of slides 21 are provided on the front of the head stock of the frame 13, with each slide arranged to cooperate with a different one of the spindles 18 for each indexable position of the spindle carrier 14. These slides 21 are arranged to slide generally radially toward and away from the corresponding spindle. In this case, with a six spindle carrier 14, the spindles are necessarily arranged 60 degrees apart in the carrier 14, however, the slides 21 need not be so arranged, and in fact, FIGURE 1 shows the slides arranged with about 45 degrees spacing in order to leave clear the areas directly vertically above and below the axis 12.

A drive train 24 is provided to drive the slides 21, and this may be from a drive means, such as the main motor 16. Drive train includes a drive shaft 25, a drive pinion 26, an idler gear 27, driven pinions 28, a cam 29 and a cam follower 30. The drive shaft 25 is located vertically below the central axis 12 and parallel thereto. The drive pinion 26 is keyed to this drive shaft 25. The idler gear 27 is a ring gear with spur gear teeth. It is a centerless gear concentrically surrounding the spindle carrier 14 and spaced therefrom. The spindle carrier is journalled in sleeve bearings 32 and 33 in the frame 13. The internal diameter 34 on the idler gear 27 is larger than the outer diameter of the spindle carrier 14 so that it does not have a radial bearing therewith. The driven pinions 28 are journalled in the frame 13 axially behind each slide 21. As shown in FIGURE 1, these six driven pinions surround the idler gear 27 and are in mesh therewith. All the pinions 26 and 28 are in the same plane as the idler gear 27 and all have spur gear teeth, although they could be helical gears or herringbone gears. As best shown in FIGURE 1, there may be positions such as the feed and eject positions of the machine tool whereat no slides 21 are provided. In such case, driven pinions 28A may still be provided meshing with the idler gear 27 to make certain that in each quadrant of the periphery, or in each 120 degrees arcuate segment of the periphery of the ring gear 27, there is a pinion meshing with the idler gear to restrain radial movement in all directions of this idler gear 27.

The machine frame 11 has first and second thrust wall means 36 and 37, respectively, which are vertical and parallel and perpendicular to the axis 12. These walls 36 and 37 define a pocket 38 in the frame 13 to receive the idler gear 27. A cover 39 may be fastened to the machine frame to cover this pocket 38. The idler gear 27 has first and second planar parallel sides 41 and 42, respectively, which define the thickness of this idler gear 27. The thickness of this gear is just slightly less than the minimum spacing between the thrust walls 36 and 37, and accordingly, the walls 36 and 37 act as axial thrust bearing means to resist any axial movement of the idler gear 27 relative to the frame 13. Also, the thickness of the gear being less than the pocket 38 permits the idler gear 27 to be inserted radially into the pocket before the cover 39 and the upper driven pinions are in place. The FIGURE 1 best shows how the drive pinion 26 and the driven pinions 28 and 28A mesh with the idler gear 27 to support this idler gear in all radial directions by engagement of the teeth thereof on the pitch circle of the idler gear. Accordingly, it will be seen that the idler gear 27 is a radial bearingless gear supported only by the teeth meshing with other gears or pinions.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine comprising, in combination, a frame having a central axis,
    a drive train in said machine,
    a bearingless idler gear included in said drive train concentric with said central axis and having first and second planar parallel sides,
    first and second axial thrust means axially spaced apart and disposed on opposite sides of said idler gear,
    the thickness of said idler gear between said parallel sides being less than the spacing between said first and second thrust means to permit radial insertion of said idler gear between said first and second axial thrust means,
    a plurality of pinions in said drive train,
    means journalling said pinions on said frame in the plane of said idler gear and each pinion meshing with said idler gear,
    the periphery of said idler gear including at least three equal arcuate segments,
    said pinions being disposed around the periphery of said idler gear with at least one pinion in each segment to restrain free movement of said idler gear in all radial directions by engagement of the teeth thereof on the pitch circle of said idler gear, and said pinions being the sole restraint of said idler gear in all radial directions.

2. A machine comprising, in combination, a frame having a central axis,
    a drive train in said machine,
    a plurality of driven pinions in said drive train,
    first and second parallel wall means defining an annular pocket in said frame,
    a bearingless idler gear included in said drive train and concentric with said central axis and disposed in said pocket and having first and second planar parallel sides disposed closely adjacent said first and second parallel wall means of said pocket as axial thrust bearing means,
    the thickness of said idler gear between said parallel sides being less than the spacing between said first and second wall means to permit radial insertion of said idler gear into said pocket,
    means journalling said pinions on said frame in the plane of said idler gear and each pinion meshing with said idler gear, said idler gear having an inner and an outer periphery,
    one of said peripheries of said idler gear having teeth and including at least three equal arcuate segments,
    said pinions being disposed around said one of said peripheries of said idler gear with at least one pinion in each segment to restrain free movement of said idler gear in all radial directions by engagement of the teeth thereof on the pitch circle of said idler gear, and said pinions being the sole restraint of said idler gear in all radial directions.

3. A machine comprising, in combination, a frame having a central axis,
    drive means,
    a drive train from said drive means in said machine,
    a plurality of driven pinions in said drive train,
    first and second parallel wall means defining an annular pocket in said frame,
    the spacing between said first and second wall means defining the minimum dimension of said pocket,
    a bearingless idler gear included in said drive train and concentric with said central axis and disposed in said pocket adjacent said wall means and having a thickness less than the spacing between said wall means to permit radial insertion of said idler gear into said pocket,
    means journalling said pinions on said frame equidistant from said central axis in the plane of said idler gear and each pinion meshing with said idler gear, said idler gear having an inner and an outer periphery,
    one of said peripheries of said idler gear having teeth and including four equal arcuate segments,
    said pinions being disposed around said one of said peripheries of said idler gear with at least one pinion in each segment to restrain free movement of said idler gear in all radial directions by engagement of the teeth thereof on the pitch circle of said idler gear, and said pinions being the sole restraint of said idler gear in all radial directions.

4. A machine tool comprising, in combination, a frame having a central axis,
    a plurality of movable members carried on said frame, drive means,
    a drive train between said drive means and each of said movable members,
    a plurality of driven pinions in said drive train and each connected to drive a different one of said movable members,
    first and second parallel wall means defining an annular pocket in said frame,
    a bearingless idler gear included in said drive train and concentrically surrounding said central axis and disposed in said pocket and having only first and second planar parallel sides disposed closely adjacent said first and second parallel wall means of said pocket, said parallel sides of said idler gear permitting radial insertion of said idler gear into said pocket, means journalling said pinions on said frame in the plane of said idler gear and each pinion meshing with said idler gear, the periphery of said idler gear including four equal arcuate quadrants, and said pinions being disposed around the periphery of said idler gear with at least one pinion in each quadrant to restrain free movement of said idler gear in all radial directions by engagement of the teeth thereof on the pitch circle of said idler gear.

5. A machine tool comprising, in combination, a frame having a central horizontal axis.

a plurality of slide members carried on said frame and each disposed for sliding movement, drive means, a drive train between said drive means and each of said slide members, a plurality of driven pinions in said drive train and each connected to drive a different one of said slide members, first and second vertical wall means defining an annular pocket in said frame, a centerless idler ring spur gear included in said drive train and concentrically surrounding said central axis and disposed in said pocket and having only first and second planar parallel sides disposed closely adjacent said first and second vertical wall means of said pocket, said parallel sides of said idler ring gear permitting radial insertion of said idler ring gear into said pocket, means journalling said pinions on said frame in the plane of said idler ring gear and each pinion meshing with said idler ring gear, the periphery of said idler ring gear including four equal arcuate quadrants, and said pinions being disposed around the periphery of said idler ring gear with at least one pinion in each quadrant to restrain free movement of said idler ring gear in all radial directions by engagement of the teeth thereof on the pitch circle of said idler ring gear.

6. A machine tool comprising, in combination, a frame having a central horizontal axis, a plurality of slides carried on said frame and each disposed for sliding movement generally radially toward and away from said axis, drive means, a drive train between said drive means and each of said slides, a drive pinion in said drive train driven from said drive means, a plurality of driven pinions in said drive train and each connected to drive a different one of said slides, first and second parallel wall means defining an annular pocket in said frame, a centerless idler ring spur gear included in said drive train and concentrically surrounding said central axis and disposed in said pocket and having only first and second planar parallel sides disposed closely adjacent said first and second parallel wall means of said pocket, said parallel sides of said idler ring gear permitting radial insertion of said idler ring gear into said pocket, means journalling said pinions on said frame in the plane of said idler ring gear and each pinion meshing with said idler ring gear, the periphery of said idler ring gear including four equal arcuate quadrants, and said pinions being disposed around the periphery of said idler ring gear with at least one pinion in each quadrant to restrain free movement of said idler ring gear in all radial directions by engagement of the teeth thereof on the pitch circle of said idler ring gear.

7. A machine tool comprising, in combination, a frame, a plurality of slides carried on said frame and each disposed for sliding movement generally radially toward and away from a central axis, drive means, a drive train between said drive means and each of said slides, a drive pinion in said drive train driven from said drive means, a plurality of driven pinions in said drive train and each connected to drive a different one of said slides, first and second parallel wall means defining an annular pocket in said frame, a centerless idler ring gear included in said drive train and concentrically surrounding said central axis and disposed in said pocket without radial bearing to the machine tool to permit radial insertion of said idler ring gear into said pocket, means journalling said pinions on said frame in the plane of said idler ring gear and each pinion meshing with said idler ring gear, and all said pinions being disposed around the periphery of said idler ring gear to restrain free movement of said idler ring gear in all radial directions by engagement of the teeth thereof on the pitch circle of said idler ring gear.

8. In a multiple spindle machine tool having a plurality of spindles in a spindle carrier journalled in a frame, the improvement comprising, in combination, a plurality of slides carried on the frame and each disposed for sliding movement generally radially toward and away from a respective one of the spindles, drive means, a drive train between said drive means and each of said slides, a drive pinion in said drive train driven from said drive means, a plurality of driven pinions in said drive train and each connected to drive a different one of said slides, wall means defining an annular pocket in the frame, a centerless idler ring gear included in said drive train and concentrically surrounding and spaced from the spindle carrier and disposed in said pocket without radial bearing to the frame to permit radial insertion of said idler ring gear into said pocket, means journalling said pinions on the frame in the plane of said idler ring gear and each pinion meshing with said idler ring gear, and all said pinions being disposed around the periphery of said idler ring gear to restrain free movement of said idler ring gear in all radial directions by engagement of the teeth thereof on the pitch circle of said idler ring gear.

9. In a multiple spindle machine tool having a spindle carrier journalled in a frame with a plurality of spindles journalled in the spindle carrier, the improvement comprising, in combination, a plurality of slides carried on the frame and each disposed for sliding movement generally radially toward and away from a respective one of the spindles, a plurality of driven pinions each connected to drive a different one of said slides, wall means defining an annular pocket in the frame, a centerless idler ring gear concentrically surrounding and spaced from the spindle carrier and disposed in said pocket without radial bearing to the frame to permit radial insertion of said idler ring gear into said pocket, means journalling said driven pinions on the frame in the plane of said idler ring gear and each meshing with said idler ring gear, drive means, a drive pinion driven from said drive means and journalled in the frame vertically below and meshing with said idler ring gear, and all said pinions being disposed around the periphery of said idler ring gear to restrain free movement of said idler ring gear in all radial directions by engagement of the teeth thereof on the pitch circle of said idler ring gear.

10. A multiple spindle machine tool comprising, in combination, a frame, a spindle carrier journalled in said frame for indexing movements to a plurality of positions, a plurality of spindles journalled in said spindle carrier equal in number to said plurality of positions, a plurality of slides carried on said frame disposed generally radially on different portions of the periphery of the spindle carrier and each disposed for sliding movement generally radially toward and away from a respective one of said spindles, drive means, a drive train between said drive means and each of said slides, a centerless idler ring gear included in said drive train and concentrically surrounding and spaced from said spindle carrier, wall means defining an annular pocket in said frame, said idler ring gear being disposed in said pocket without radial bearing to said frame to permit insertion of said idler ring gear radially into said pocket, a drive pinion in said drive train between said drive means and said idler ring gear and journalled in said frame vertically below and meshing with said idler ring gear, a plurality of driven pinions equal in number to said plurality of positions and disposed in said drive train between said idler ring gear and the respective slide, means journalling said driven pinions on said frame in the plane of said idler ring gear and said drive pinion and each meshing with said idler ring gear, and all said pinions being disposed around the periphery of said idler ring gear to restrain free movement of said idler ring gear in all radial directions by engagement of the teeth thereof on the pitch circle of said idler ring gear.

References Cited

UNITED STATES PATENTS

| | | | |
|---|---|---|---|
| 2,516,077 | 7/1950 | Schmitter | 74—410 |
| 2,555,586 | 6/1951 | Falk | 74—410 |
| 3,105,395 | 10/1963 | Perkins | 74—410 |
| 3,194,093 | 7/1965 | Binns et al. | 82—28 |

MILTON KAUFMAN, *Primary Examiner.*

DAVID J. WILLIAMOWSKY, *Examiner.*

C. J. HUSAR, *Assistant Examiner.*